(12) United States Patent
Payne et al.

(10) Patent No.: US 7,917,133 B2
(45) Date of Patent: Mar. 29, 2011

(54) METHOD AND APPARATUS FOR AFTER-MARKET VENDING OF FEATURE-PROVISIONING SOFTWARE TO THIRD PARTY MOBILE WIRELESS COMMUNICATION DEVICES

(75) Inventors: Susan Payne, Toronto (CA); Kerry W. Johnson, Kanata (CA); Kevin J. Oerton, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1508 days.

(21) Appl. No.: 11/019,941

(22) Filed: Dec. 23, 2004

(65) Prior Publication Data

US 2006/0143264 A1 Jun. 29, 2006

(51) Int. Cl.
*H04M 3/00* (2006.01)
(52) U.S. Cl. ........ 455/419; 455/405; 455/406; 455/407; 455/408; 455/409; 455/410; 455/411; 455/466; 705/14.64; 705/26; 705/64
(58) Field of Classification Search ............... 455/414.1, 455/419, 418, 466, 414.2, 414.3, 414.4, 405–411; 709/217–219, 201; 713/168–178; 705/14, 705/15, 18, 26, 14.64, 64
See application file for complete search history.

(56) References Cited

U.S. PATENT DOCUMENTS

| | | | | |
|---|---|---|---|---|
| 5,485,505 A | * | 1/1996 | Norman et al. | 455/419 |
| 5,748,485 A | * | 5/1998 | Christiansen et al. | 700/234 |
| 6,707,915 B1 | * | 3/2004 | Jobst et al. | 380/247 |
| 6,810,234 B1 | * | 10/2004 | Rasanen et al. | 455/41.2 |
| 7,065,388 B2 | * | 6/2006 | Minear et al. | 455/566 |
| 7,167,711 B1 | * | 1/2007 | Dennis | 455/456.1 |
| 7,447,784 B2 | * | 11/2008 | Eun | 709/229 |
| 2002/0123336 A1 | * | 9/2002 | Kamada | 455/420 |
| 2002/0160752 A1 | * | 10/2002 | Hook et al. | 455/412 |
| 2002/0193094 A1 | * | 12/2002 | Lawless et al. | 455/407 |
| 2002/0198791 A1 | * | 12/2002 | Perkowski | 705/26 |
| 2004/0034568 A1 | * | 2/2004 | Sone | 705/26 |
| 2004/0148229 A1 | * | 7/2004 | Maxwell | 705/26 |
| 2004/0171378 A1 | * | 9/2004 | Rautila | 455/419 |
| 2004/0243477 A1 | * | 12/2004 | Mathai et al. | 705/26 |
| 2004/0248554 A1 | * | 12/2004 | Khan et al. | 455/411 |
| 2005/0177442 A1 | * | 8/2005 | Sullivan et al. | 705/26 |

FOREIGN PATENT DOCUMENTS

EP 1043906 * 10/2000

* cited by examiner

*Primary Examiner* — Charles N Appiah
*Assistant Examiner* — Olumide T Ajibade-Akonai
(74) *Attorney, Agent, or Firm* — Perry + Currier Inc.

(57) ABSTRACT

After market vending of feature-provisioning software to qualified third party mobile wireless communication devices is facilitated by providing a joint software vending machine website capable of authenticating the device and wireless service provider and downloading and activating only software appropriate to that particular user device and wireless network service provider. The exemplary system provides device/user qualification and/or authentication as well as device provisioning for mobile wireless communication devices that may be manufactured by different vendors for different purposes and serviced by different wireless network service providers via a wireless infrastructure which includes a communication data relay service provider.

21 Claims, 8 Drawing Sheets

Fig. 4j

Congratulations.

Your _____ device is now provisioned with purchased SW and is activated for use. If you have any difficulty, please go to web site _____.

Thank you for your purchase.

METHOD AND APPARATUS FOR AFTER-MARKET VENDING OF FEATURE-PROVISIONING SOFTWARE TO THIRD PARTY MOBILE WIRELESS COMMUNICATION DEVICES

BACKGROUND OF THE INVENTION

1. Technical Field

This invention generally relates to automated vending of feature-provisioning software to mobile wireless communication devices.

2. Related Art

Automated vending of various services and products, including computer software, from internet websites is now common practice. In fact, there are online software distribution websites commercially available for down-loading software to mobile devices such as personal digital assistants and the like which may include various types of wireless connectivity to various communication networks.

However, special problems are encountered when plural hardware providers, wireless network service providers, jointly developed feature-provisioning software and the like are involved. For example, not all devices and/or users may be qualified to download and/or use certain feature-provisioning software. The involvement of a wireless infrastructure including communication data relay service provider may also pose unique problems to be addressed. It is not believed that any prior existing feature-provisioning software vending website has the capability to handle such a complex infrastructure.

BRIEF SUMMARY

We have now recognized that it is possible to provide a vending machine website for vending feature-provisioning software to third party mobile wireless communication devices even in a complex system involving a plurality of different device hardware vendors, a plurality of wireless network service providers, a wireless infrastructure including a communications data relay service provider and the like. Furthermore, we have discovered that our solution may also be suitable for less complex systems (e.g., perhaps not involving a plurality of entities at each level).

One exemplary software vending machine website system permits one or more third parties (e.g., hardware vendors) to develop desired further application software (e.g., using licensed service provider software via a furnished API for each of various features) and then have such software competently (and automatically) vended to provision devices already owned by third-party end users. In short, this vending machine model may be applicable to any type of software for a wireless device including service provider software, third party applications, etc. This vending machine model provides a system that permits an end user to easily download software onto their wireless devices in a joint software solution.

One goal of an exemplary vending machine website is to distribute such joint software as an after market add-on to consumer devices. The following are some possible objectives of this vending machine distribution method:

Provides simplified end-user experience (e.g., user does not need to visit multiple websites to install an application).

Competitive responses to other existing hardware/service provider partnerships. This may allow a new service provider to provide a solution on an existing hardware platform without a direct marketing partnership with the hardware manufacturer.

Implement commitments to a hardware device manufacturer for distributing a joint solution on desired hardware platforms.

Additional penetration of other services through uptake of additional hardware devices.

One exemplary vending machine system operation is summarized below:

1. Service Provider R (e.g., a communications data relay service provider) provides a download website that provides remote download of jointly developed/owned software.
2. Wireless service provider carriers W that provide service using hardware devices H may provide links to this download website, so that the user may initially navigate to Service Provider R's vending machine site via the wireless carrier W service provider's website.
3. User may be qualified (e.g., their handset can be approved by Service Provider R, wireless carrier W may be checked to insure support service by Service Provider R, PIN may be checked for authenticity, and/or other checks, etc. are possible) through an authorization/authentication system.
4. User may sign up for and agree to a support agreement prior to download.
   Enterprise IT department (for enterprise user) preferably may sign up for support prior to downloading joint software.
   Prosumer users preferably may subscribe to support prior to downloading joint software.
5. User may navigate to an appropriate download link.
6. User may agree to payment terms, including applicable taxes.
7. Payment may be processed (payment for support agreement and/or joint software license):
   The user may download joint software installer (e.g., to his/her PC base unit).
   The user may unzip and install joint desktop software (e.g., on his/her PC). The user preferably may acknowledge an EULA (end user license agreement) before installation occurs.
8. Using joint desktop PC software, the user may install downloaded software to the user device.
9. The user may initiate device provisioning:
   Enterprise may be activated through whatever enterprise activation mechanism is in place for the joint-software.
   Prosumer user may activate using existing provisioning.

This invention may be embodied in hardware, software or a combination of hardware and software. The invention also provides a method for after-market vending of feature-provisioning software to third party mobile wireless communication devices. The exemplary embodiment is realized, at least in part, by executable computer program code (i.e. logic) which may be embodied in physical program memory media.

BRIEF DESCRIPTION OF THE DRAWINGS

These and other objects and advantages of this invention will be better understood and appreciated in conjunction with the following detailed description of exemplary embodiments taken together with the accompanying drawings, of which:

FIGS. 4a-4j are schematic exemplary graphical user interface (GUI) screens that may be utilized in operation of the exemplary embodiment of FIG. 3.

DETAILED DESCRIPTION OF EXEMPLARY EMBODIMENTS

Figure 1:
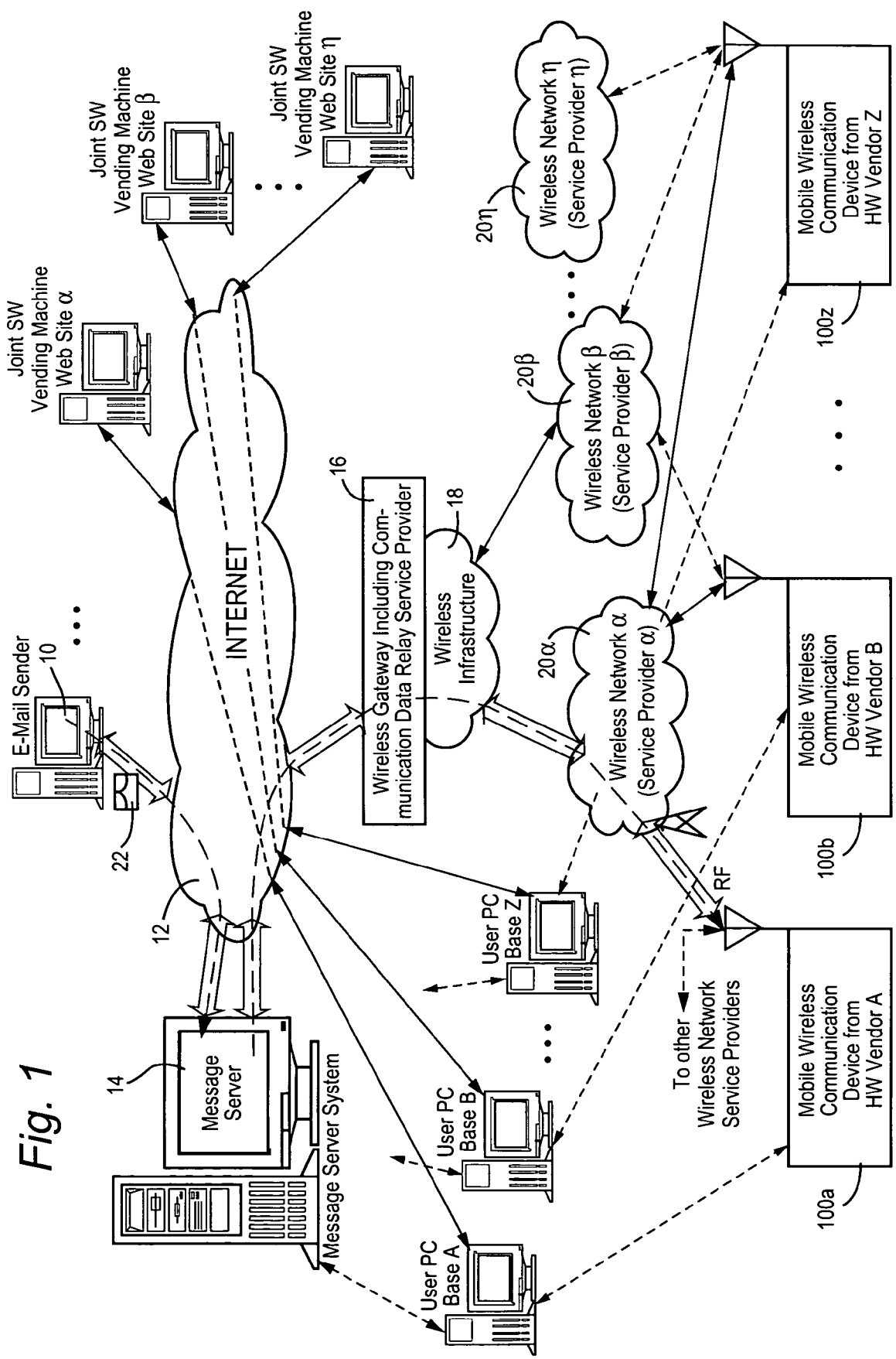
FIG. 1 is an overall system wide schematic view of an exemplary wireless communication system incorporating a mobile wireless communication device that may be provisioned with feature-provisioning software from an after-market vending machine website.

FIG. 1 is an overview of an exemplary communication system in which wireless communication devices 100a-100z may be used. One skilled in the art will appreciate that there may be hundreds of different system topologies. There may also be many message senders and recipients. The simple exemplary system shown in FIG. 1 is for illustrative purposes only, and also shows perhaps the currently most prevalent Internet email environment in the context of the exemplary system of FIG. 1.

For example, FIG. 1 shows an email sender 10, the Internet 12, a message server system 14, a wireless gateway 16 (including a communications data relay service provider), wireless infrastructure 18, a wireless service provider networks 20α, 20β ... 20η and mobile communication devices 100a, 100b ... 100z from hardware vendors A, B, ... Z respectively.

An email sender 10 may, for example, be connected to an ISP (Internet Service Provider) on which a user of the system has an account, located within a company, possibly connected to a local area network (LAN), and connected to the Internet 12, or connected to the Internet 12 through a large ASP (Application Service Provider) such as American Online™ (AOL). Those skilled in the art will appreciate that the systems shown in FIG. 1 may instead be connected to a wide area network (WAN) other than the Internet, although email transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for email exchange over the Internet 12. Although other messaging systems might not require a message server system 14, a mobile device 100a ... 100z configured for receiving and possibly sending email will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just email sending and receiving; they also include dynamic database storage engines that have predefined database formats for data like calendars, to-do lists, task lists, email and documentation.

The wireless gateway 16 (and its included communication data relay service provider) and infrastructure 18 provide a link between the Internet 12 and the wireless networks 20α, 20β ... 20η. The wireless infrastructure 18 determines the most likely wireless network for locating a given user and tracks the users as they roam between countries or networks. A message is then delivered to the appropriate mobile device 100a ... 100z via wireless transmission, typically at a radio frequency (RF), from a base station in one of the wireless networks 20α ... 20η to a mobile device 100a ... 100z. The particular network 20α-20η may be virtually any wireless network over which messages may be exchanged with a mobile communication device.

As shown in FIG. 1, a composed email message 22 is sent by the email sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein some mobile device 100x must request that stored messages be forwarded by the message server to the mobile device 100x. Some systems provide for automatic routing of such messages which are addressed using a specific email address associated with the mobile device 100x. In a preferred embodiment, messages addressed to a message server account associated with a host system such as a home computer or office computer which belongs to the user of a mobile device 100x are automatically (i.e., "pushed") from the message server 14 to the mobile device 100x as they are received.

Regardless of the specific mechanism controlling forwarding of messages to a given mobile device 100x, the message 22, or possibly a translated or reformatted version thereof, is sent to wireless gateway/relay 16. The wireless infrastructure 18 includes a series of connections to wireless networks 20α ... 20η. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

It will be understood that the mobile wireless communication devices 100a-100z from hardware vendors A-Z may or may not involve email features (e.g., interfacing with email sender 10, or the like, or with each other, with respect to email). Instead, these devices may be solely devoted to other kinds of wireless communication functionality (e.g., address book support, an appointment/calendar support, web browser support, etc.)

However, in the present exemplary embodiment, both email functionality and other functionalities are presumed to be supported by the wireless gateway 16 including a communications data relay service provider which, in conjunction with suitable enterprise software or other controlling software in a message server system 14, can arrange to "push" email and other data types through any one or more suitable wireless network service providers α-η to the appropriate ones of mobile wireless communication devices 100a-100z any one of which may come from plural different hardware vendors A-Z.

In this particular exemplary embodiment, plural software vending machine websites α-η are provided and respectively associated with the wireless network service providers α-η. It will be understood that fewer (even a single) joint software vending machine website might be utilized to service all of the various wireless network service providers.

In the exemplary embodiment, the joint software being vended necessarily includes software developed by and therefore compatible with the communications data relay service provider providing, at least in part, wireless gateway 16 and related co-functioning software on the message server systems 14 (e.g., so as to "push" data of various kinds to the appropriate wireless communication devices). The communications data relay service provider may develop joint software with one or more of the various hardware venders A-Z and/or with one or more of the wireless network service providers α-η. This joint developed software is then made accessible via the Internet by one or more joint software vending machine websites as depicted.

Typically, each mobile wireless communication device will have a port for connection to a user PC base unit A-Z as also depicted by dotted lines in FIG. 1. Of course, each mobile wireless communication device is also adapted for RF communication via a wireless network service provider and the wireless infrastructure to the Internet 12. Accordingly, it is possible to configure this exemplary system so as to permit direct downloading of joint software from a vending machine website to a mobile wireless communication device. However, more typically, it may be more practical to configure the system so as to first have the appropriate user PC base unit communicate with the appropriate joint software vending machine website directly via the Internet and then to subsequently further download selected feature-provisioning software from the user PC base unit to the mobile wireless communication device when it is connected thereto (e.g., via wired, IRDA, Bluetooth, USB, WiFi, GPRS, etc.).

Figure 2:
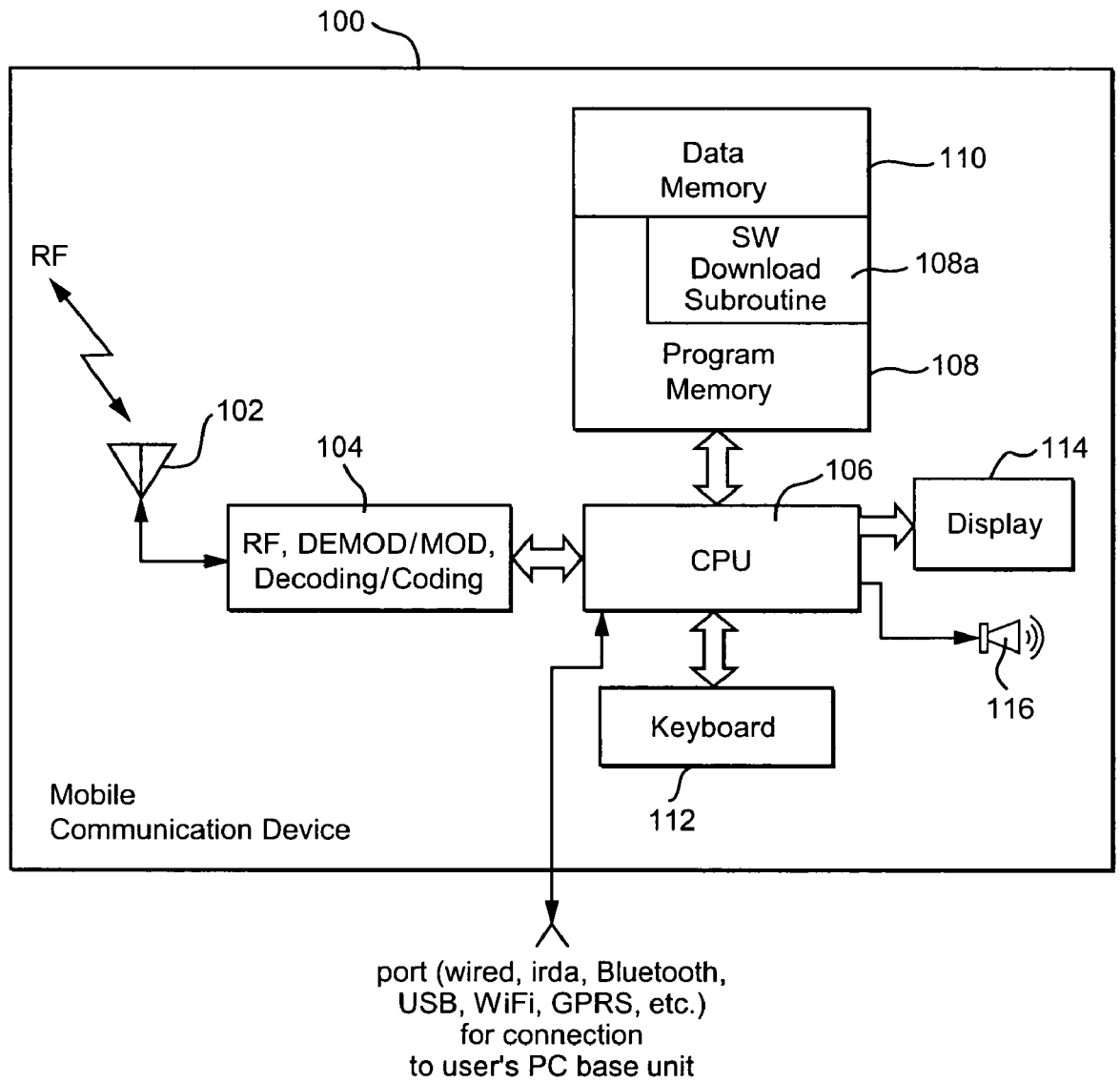
FIG. 2 is an abbreviated schematic diagram of hardware that may be included within an exemplary mobile wireless communication device.

As depicted in FIG. 2, each mobile communication device 100a-z includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100a-z will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of program memory 108a is available for storing one or more software download programs (e.g., sub-routines). Suitable computer program executable code is stored in other portions of program memory 108 to effect operational features of the device—including newly downloaded feature provisioning software after it has been suitably activated.

Figure 3:
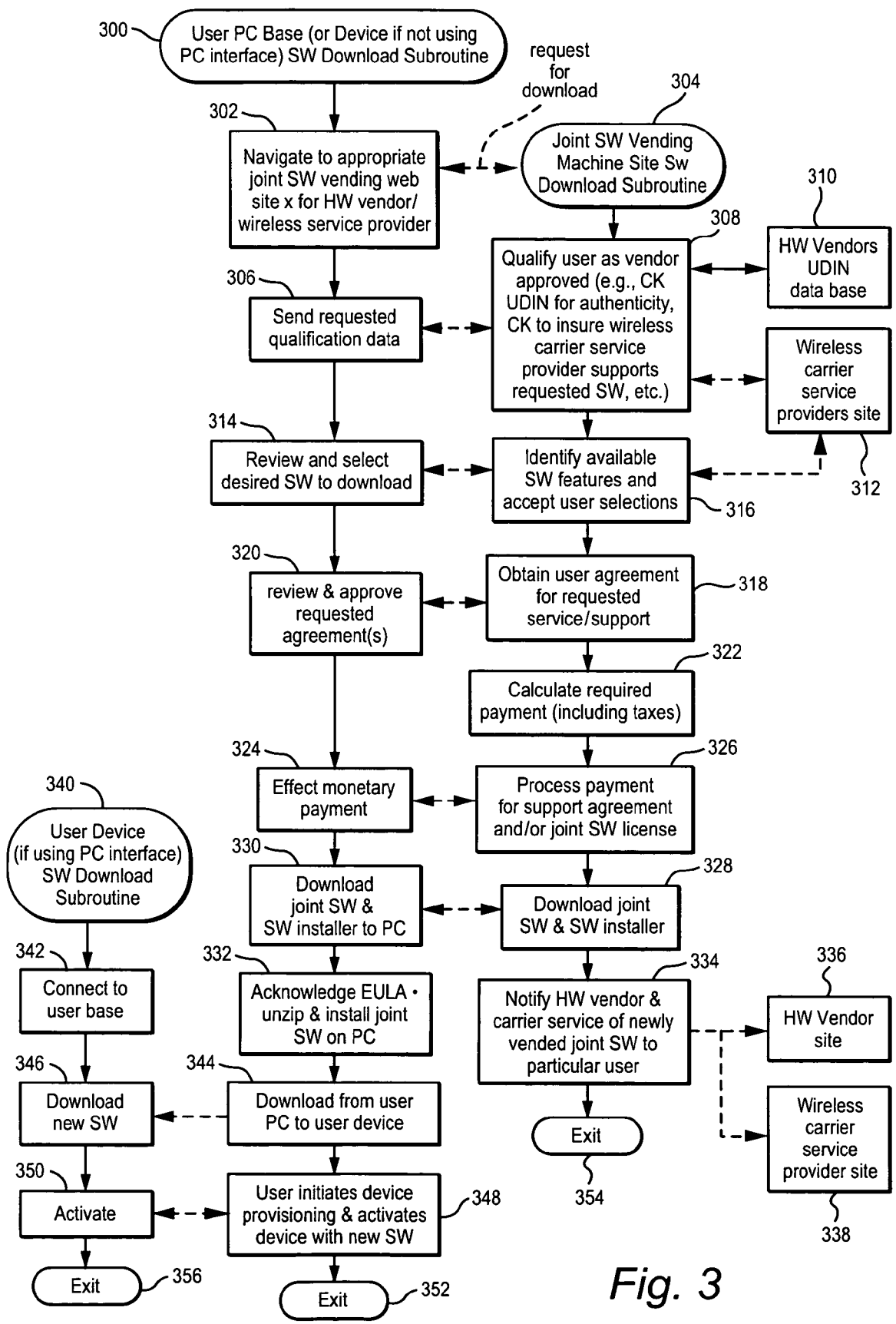
FIG. 3 is an exemplary abbreviated schematic flow diagram of computer program software (i.e., logic) that may be utilized by (a) the user device (if using a PC base unit interface), (b) the user PC base unit (or the device itself if not using a PC base unit interface), and (c) a joint software vending site in one exemplary embodiment of this invention.

The software depicted at the left-most column in FIG. 3 is an exemplary user device software download sub-routine of program logic to be found in the device program memory 108a if an intermediate PC base unit interface is employed during the downloading process. If not, then more extensive download control software would be required (e.g., including that depicted in the exemplary embodiment of FIG. 3 at the center column for a user PC base download sub-routine, again, assuming that a PC base interface is employed). Exemplary program logic for operating the joint software vending machine website download sub-routine is depicted at the right-most column in FIG. 3 (including some depictions of interfaces with other databases and websites on the extreme right hand side of FIG. 3).

In this exemplary embodiment, a user desiring to download feature-provisioning software could first of all operate his or her PC base unit so as to enter the download control sub-routine at 300. The user would then conventionally navigate with a web browser or the like to an appropriate joint software vending website for his or her particular hardware vendor/wireless service provider as depicted in FIG. 3 at 302. Access to the joint software vending machine site activates the appropriate software sub-routine 304 at the vending machine site when this incoming request for download is detected.

Figure 4A:
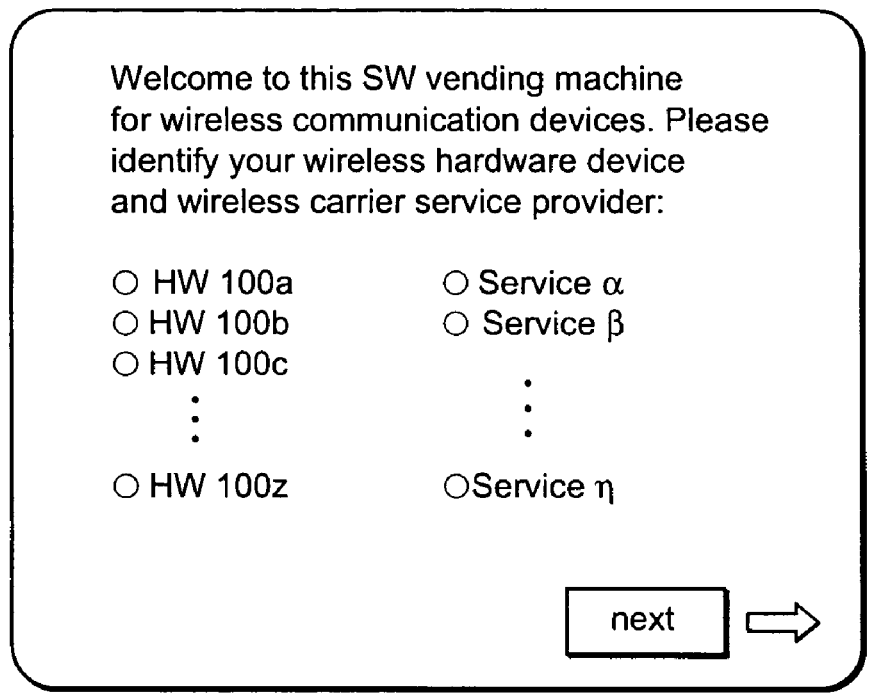
Figure 4B:
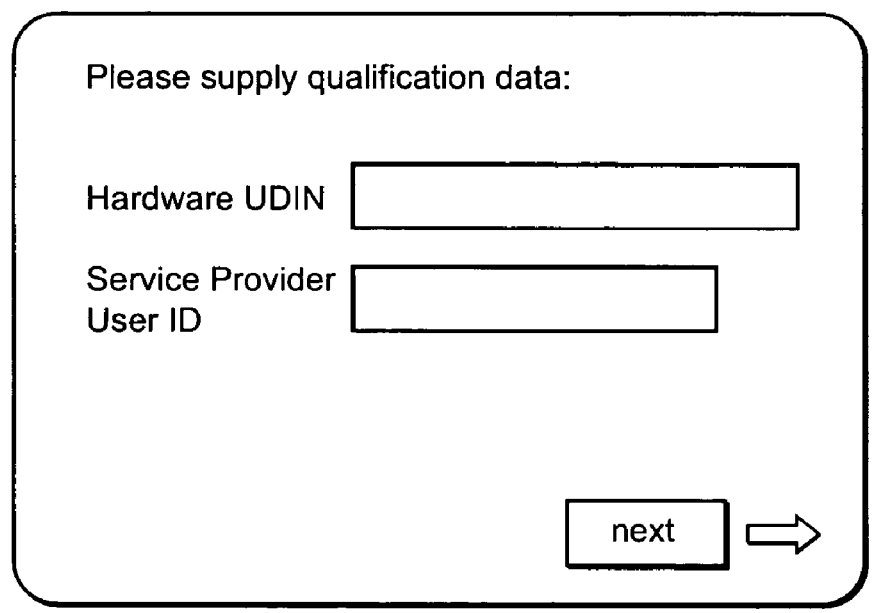

The user's PC base unit screen might then appear depicted in FIG. 4a requiring the user to identify a particular hardware device and a particular wireless carrier service provider. By activating the "next" text in FIG. 4a (e.g., by "clicking" a mouse switch when the cursor is located over this text box), this requested qualification data is sent from the PC base unit as depicted at 306 to the joint software vending machine site. In return, the joint vending machine site may cause the PC base unit to display a new screen as depicted at FIG. 4b requiring the input of still more specific identifying and qualifying data. For example, a unique device identification number (UDIN) may be required as well as a user ID assigned to that particular user by the appropriate service provider or the like. As will be appreciated, any desired additional such qualifying data may be required in any particular implementation. Again by selecting the "next" text box (i.e, by "clicking" on it), the user can cause such requested qualification data to be transmitted back to the joint software vending machine site as depicted at box 306 in FIG. 3. At 308, the supplied data is checked for authenticity (e.g., against the hardware vendors UDIN data base 310 and/or data available at a wireless carrier service provider site 312 or the like—either of which may be locally stored at the vending machine site or accessed via a remote further website as may be appropriate).

Figures 4C, 4D:

Once a requesting user and his/her user device has been appropriately qualified, then the vending machine site may download to the user a further screen such as depicted in FIG. 4c permitting the user to review and select desired, qualified, feature-provisioning software that he/she wishes to purchase and download (as depicted at box 314 in FIG. 3). Once the desired user selections have been made, then again by activating the "next" text box on the screen, the desired selections are communicated to the vending machine site at 316 where they are tentatively accepted (e.g., sufficiently to identify and obtain the required user agreement for this particular requested service/support as depicted in 318 in FIG. 3). Of course there may be confirmation of a summary of purchases such as depicted in FIG. 4d also involved.

Figures 4E, 4F:
Figure 4G:
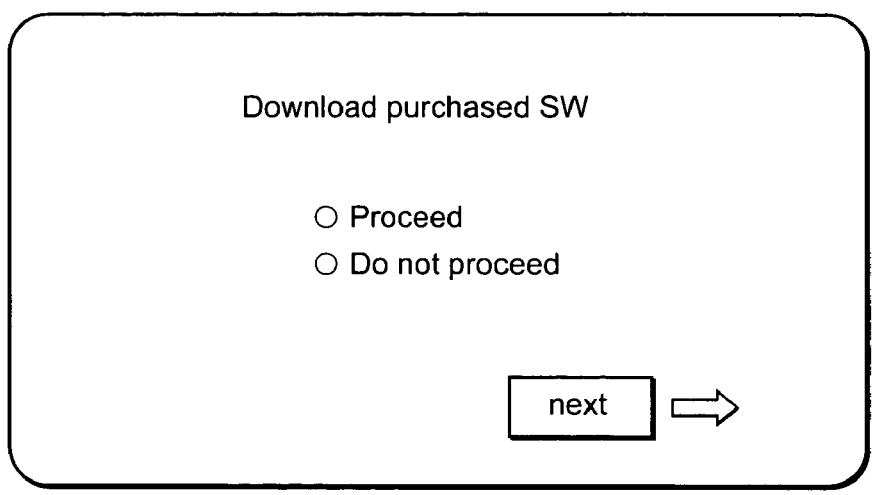
Figure 4H:
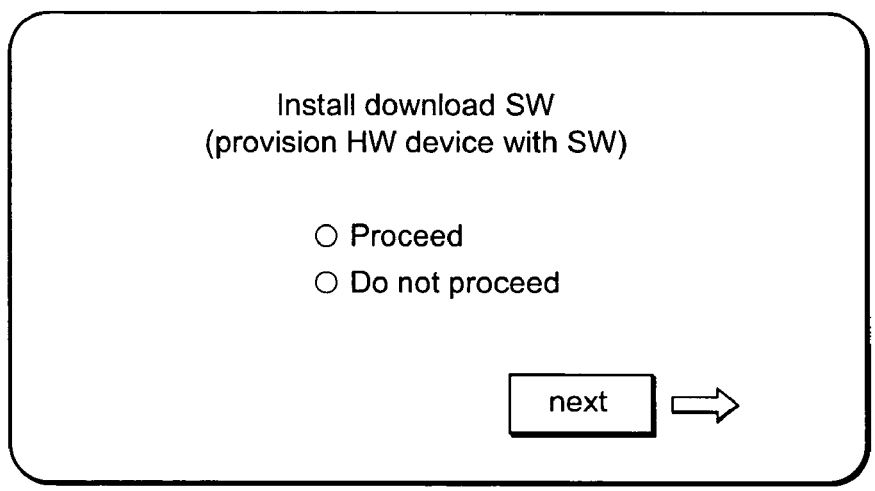

The appropriate user agreement is displayed to the user as depicted in FIG. 4e where the user may review and approve the requested agreement(s) as depicted at 320 in FIG. 3. The user acceptance action is communicated to the vending machine site upon activation of the "next" text box in the screen of FIG. 4e. At this point (or some prior point if desired), the required total payment including taxes is calculated and a screen to that effect is communicated back to the user (e.g., as depicted at FIG. 4f). By making entries at this screen and activating the "next" text box, the user can effect monetary payment as depicted at box 324 in FIG. 3. Although in this exemplary embodiment a one-time lump sum payment is made, it will be appreciated that recurring periodic (e.g., monthly) payments may be effected if desired. This monetary payment is appropriately processed with credit or debit card transaction(s) at 326 before the requested software and any required software installer is downloaded at 328. As will be appreciated, intermediate user interface screens may be utilized in this process such as depicted at FIG. 4g. After download of the feature-provisioning software and installer at 330, a check may be made again to insure that the appropriate EULA has been agreed to before the downloaded software is unzipped and installed at 332. Once again, a suitable screen such as depicted in FIG. 4h may be utilized during this procedure.

At the joint software vending machine site, the transaction may be concluded at 334 by notifying the appropriate hardware vendor(s) and/or wireless carrier service(s) that the vended joint software has now been dispensed to a particular user (who may, if appropriate, now be obligated to make recurring monthly service payments). Appropriate notifications may go, for example, to the hardware vendor site 336 and/or wireless carrier service provider site 338 or the like.

Now that the downloaded feature-provisioning software has been installed on the user PC base unit, if not already connected, the user device must be connected thereto (e.g., via its connection port) and the appropriate user device software download sub-routine 340 entered. The connection to the user base as indicated at 342 may occur before or after such sub-routine is entered as may be appropriate to some particular implementation. The PC base unit software at 344 then cooperates via the connection between the units to the device software 346 so as to further download the new software to the device. Thereafter, the user PC base software at 348 cooperates with the activation software 350 of the user device so as to activate the newly downloaded software and add new functionality to the user device. For example, the newly downloaded software typically will be integrated together with (e.g., "linked" and/or "loaded") other software stored in the memory 108 and the user device may have to be re-started or the like to fully activate the newly downloaded features.

Of course the installer routine will check to insure that proper memory space is available on the device. That is, when newly downloaded software is added (and/or checks are made to insure that correct software versions and features are being installed) potential memory allocation problems are resolved.

Once the respective sub-routines 300, 304 and 340 are completed, then they are of course respectively exited in their respective hardware devices at 352, 354 and 356 respectively.

Figure 4I:
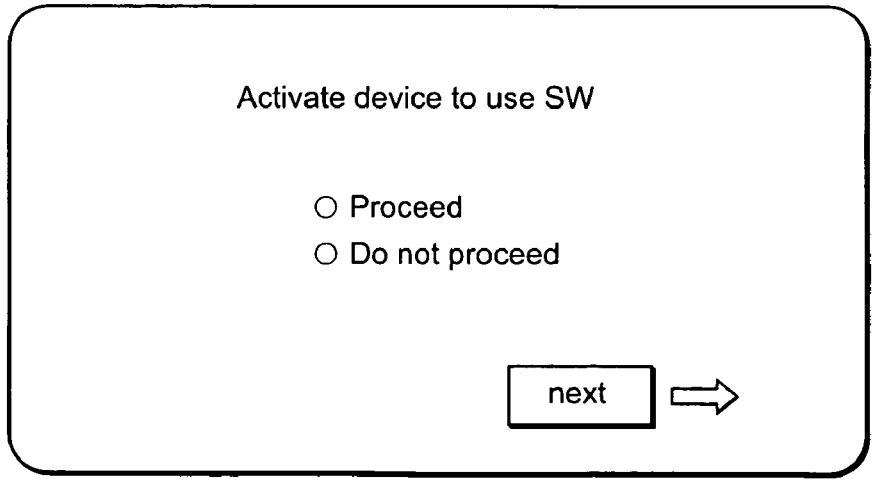

As will be appreciated, a screen such as depicted in FIGS. 4h and 4i may be utilized in conjunction with processes 344-350 and a final screen as depicted in 4j may be finally depicted on the screen of the PC base unit and/or the user device itself to finally conclude the processes before exit is taken at 352, 356.

In line with the above description of an exemplary embodiment, it should be understood that this exemplary embodiment may have the following features:
  a. Linkage to carriers allows a carrier to skin/theme/modifications the front end of the vending website engine to their needs.
  b. The engine may, if desired, accept payment in a variety of popular formats.
  c. The engine may, if desired, also determine which piece of software the user wanted to download through a combination of user interaction, automated software agent on PC or Wireless handheld, and carrier inputs.
  d. The engine in combination with item c above, could be able to determine if the device connected was a suitable candidate for the requested software.
  e. Software(s) can then be downloaded to the wireless device via some connector (whether through the PC-IRDA, PC-Bluetooth, PC-USB), or completely Wireless (WiFI, GPRS, etc.).
  f. Because of item a above, other provisioning issues (billing, service plans, legal, etc.) with the carrier can be activated/authenticated at the same time.
  g. If the communications data relay service provider has an infrastructure similar to item f above, it may also authenticate the device against its infrastructure or the carrier may authenticate through the relay service provider's infrastructure.
  h. Data stream may or may not be encrypted/authenticated between all the components for enterprise security.
Furthermore, the software downloads may include:
  a. Customizable end user software (e.g., the relay service provider's applications)
  b. Software download agents (to PC or wireless handheld)
  c. Software authentication agents (to PC or wireless handheld)
Still further, authentication can be run against multiple infrastructure parties including the relay service provider, the wireless carrier and even the hardware manufacturer if necessary.

Unique identifiers for each party can be included and automated for all users. For example: for the relay service provider this could be PIN, and auth string, for hardware device manufacturers it could be IMEI, for a wireless carrier it could be ICCID+IMEI. Authentication could also be used to bring information back to the parties in regard to configuration of the device, to assist in installation and download issues, (i.e., ROM version checking, service plan checking, etc.).

By completing these types of processes, the correct software may be downloaded to the device, with the following:
  a. Ensure correct software versions
  b Ensure correct software features
  c. Provide audit trail for software downloading so support reps from all the various parties can know what has been done with the device.
  d. Software engine may or may not monitor the installation of the application, if monitoring is employed, its purpose is to provide troubleshooting assistance to support reps.

In the above described exemplary embodiments, version updates of the vended software can also be accommodated. While this typically may depend on the OS platform, in general, devices running a vended program can accept version upgrades through the device's native OS routine. Logic is typically built into the OS/Installer/Wed site that allows version checking and upgrading. The source of the vended software may provide update information to the vending machine which, in turn, can inform the vending machine users.

Typically, a vending machine user may be presented with an option of choosing between different versions of software (e.g., having different functionality, compatibility, cost, performance and/or other factors) as may be desired. In the present exemplary embodiments, bug notices may only be sent (independently of the vending machine) to those subscribing to ongoing support services.

As those in the art will appreciate, variations and modifications may be made in the exemplary embodiments described above while yet retaining some of the novel features and advantages of this invention. Accordingly, all such variations and modifications are intended to be included within the scope of the following claims.

What is claimed is:

1. A method for selectively vending feature-provisioning software to qualified mobile wireless communication devices manufactured by a first party but serviced by at least one other party including a wireless service provider, said method comprising: maintaining an internet website having access to a menu comprising a plurality of down-loadable feature provisioning software and respective prices; providing download access control software to access and use said website; authenticating said mobile wireless communication device by data exchanges with said website as a qualified hardware device suitable and authorized for receiving said menu, said authenticating step including use of a unique device identification number (UDIN) that is unique to the particular mobile wireless communication device requesting a download of said feature-provisioning software and a user ID assigned for use on said mobile wireless communication device by a particular wireless carrier service provider; providing qualified suitable feature-provisioning software at stated prices from said menu for selection; effecting monetary payment for the selected feature-provisioning software by data exchanges with said website; and if authenticated and monetary payment has been received, downloading the qualified selected feature-provisioning software via the internet; wherein said at least one other party includes a communication data relay service provider and said software is jointly developed and/or owned by said communication data relay service provider and at least one further party selected from the group consisting of said wireless service provider and said first party.

2. A method as in claim 1 further comprising:
providing download provisioning software in said mobile wireless communication device and using such provisioning software to accept further downloading of the purchased feature-provisioning software from said base unit to which the feature-provisioning software was previously downloaded from said website.

3. A method as in claim 1 wherein respective subsets of said mobile wireless communication devices are manufactured by each of a plurality of respective first parties.

4. A method as in claim 3 wherein said at least one other party includes plural wireless service providers.

5. A method as in claim 4 wherein said at least one other party includes a single communication data relay service provider interfacing with each of said plural wireless service providers.

6. A method for vending feature-provisioning software to qualified mobile wireless communication devices manufactured by a first party but jointly serviced by other parties including at least one wireless service provider and a communication data relay service provider, said method comprising: maintaining an internet website having access to at least one down-loadable feature provisioning software jointly developed and/or owned by said first party and at least said communication data relay service provider; providing download access control software for use by a PC base unit to access said website via a base unit that has (a) access to said website and (b) a wired connector for connection to a mobile wireless communication device; authenticating said mobile wireless communication device by data exchanges between said website and said PC base unit as a qualified hardware device, said authenticating step including use of a unique device identification number (UDIN) that is unique to the particular mobile wireless communication device requesting a download of said feature-provisioning software and a user ID assigned for use on said mobile wireless communication device by a particular wireless carrier service provider; effecting monetary payment for user-selected feature-provisioning software by data exchanges between said website and said PC base unit; and if authenticated and monetary payment has been received, downloading the requested feature-provisioning software to said qualified PC base unit via the internet; and providing download provisioning software in said mobile wireless communication device and using such provisioning software to accept further downloading of the purchased feature-provisioning software from said PC base unit.

7. A method as in claim 6 wherein plural down-loadable feature provisioning software are accessible at respectively associated prices at said website thereby providing a vending machine type of choice as to which such features are to be purchased and downloaded.

8. A system for selectively vending feature-provisioning software qualified to mobile wireless communication devices manufactured by a first party but serviced by at least one other party including a wireless service provider, said system comprising: an internet website having access to at least one down-loadable feature provisioning software; download access control software disposed for use by a device user to access and use said website; means for authenticating said mobile wireless communication device by data exchanges with said website as a qualified hardware device suitable and authorized for receiving said feature-provisioning software, said means for authenticating adapted to use a unique device identification number (UDIN) that is unique to the particular mobile wireless communication device requesting a download of said feature-provisioning software and a user ID assigned for use on the device by a particular wireless carrier service provider; qualified suitable feature-provisioning software accessible at stated prices on said website for selection via a device user interface; means for effecting monetary payment by data exchanges with said website for user-selected feature-provisioning software; and means for downloading qualified user-selected feature-provisioning software via the internet if the requesting hardware device has been authenticated and monetary payment has been received; wherein said at least one other party includes a communication data relay service provider and said software is jointly developed and/or owned by said communication data relay service provider and at least one further party from the group consisting of said wireless service provider and said first party.

9. A system as in claim 8 further comprising:
download provisioning software disposed in said mobile wireless communication device to accept further downloading of the purchased feature-provisioning software from a user base unit to which the feature-provisioning software was previously downloaded from said website.

10. A system as in claim 8 wherein respective subsets of said mobile wireless communication devices are manufactured by each of a plurality of respective first parties.

11. A system as in claim 10 wherein said at least one other party includes plural wireless service providers.

12. A system as in claim 11 wherein said at least one other party includes a single communication data relay service provider interfacing with each of said plural wireless service providers.

13. A system for vending feature-provisioning software to qualified mobile wireless communication devices manufactured by a first party but jointly serviced by other parties including at least one wireless service provider and a communication data relay service provider, said system comprising: an internet website having access to at least one down-loadable feature provisioning software jointly developed and/or owned by said first party and at least said communication data relay service provider; download access control software disposed for use by a device user PC base unit to access said website via a user PC base unit that has (a) access to said website and (b) a wired connector for connection to a mobile wireless communication device; means for authenticating said mobile wireless communication device by data exchanges between said website and said user PC base unit as a qualified hardware device, said means for authenticating adapted to use a unique device identification number (UDIN) that is unique to the particular mobile wireless communication device requesting a download of said feature-provisioning software and use of a user ID assigned to a user of the device by a particular wireless carrier service provider; means for effecting monetary payment by data exchanges between said website and said user PC base unit for user-selected feature-provisioning software; and means for downloading the requested feature-provisioning software to said qualified user PC base unit via the internet if the requesting hardware device has been authenticated and monetary payment has been received; and download provisioning software disposed in said mobile wireless communication device to accept further downloading of the purchased feature-provisioning software from said user PC base unit.

14. A system as in claim 13 wherein plural down-loadable feature provisioning software are accessible at respectively associated prices at said website thereby providing a vending machine type of choice for a device user as to which such features are to be purchased and downloaded.

15. A "non-transitory" machine readable medium on which is disposed at least one computer program which, when executed by at least one suitable computer, will effect a method for selectively vending feature-provisioning software to qualified mobile wireless communication devices manufactured by a first party but serviced by at least one other party including a wireless service provider, said method comprising: maintaining an internet website having access to at least one down-Loadable feature provisioning software; providing download access control software for use via a device user interface to access and use said website; authenticating said mobile wireless communication device by data exchanges with said website as a qualified hardware device suitable and authorized for receiving said feature-provisioning software, said authenticating step including use of a unique device identification number (UDIN) that is unique to the particular mobile wireless communication device requesting a download of said feature-provisioning software and a user ID assigned for use on said mobile wireless communication device by a particular wireless carrier service provider; providing qualified suitable feature-provisioning software at stated prices for selection; effecting monetary payment for the selected feature-provisioning software by data exchanges with said website; and if authenticated and monetary payment has been received, downloading the qualified selected feature-provisioning software via the internet; wherein said at least one other party includes a communication data relay service provider and said software is jointly developed and/or owned by said communication data relay service provider and at least one further party from the group consisting of said wireless service provider and said first party.

16. A non-transitory machine readable medium as in claim 15 further comprising computer program software: providing download provisioning software in said mobile wireless communication device and using such provisioning software to accept further downloading of the purchased feature-provisioning software from a user base unit to which the feature-provisioning software was previously downloaded from said website.

17. A non-transitory machine readable medium as in claim 15 wherein respective subsets of said mobile wireless communication devices are manufactured by each of a plurality of respective first parties.

18. A non-transitory machine readable medium as in claim 17 wherein said at least one other party includes plural wireless service providers.

19. A non-transitory machine readable medium as in claim 18 wherein said at least one other party includes a single communication data relay service provider interfacing with each of said plural wireless service providers.

20. A "non-transitory" machine readable medium on which is stored at least one computer program which, when executed by at least one suitable computer, will effect a method for vending feature-provisioning software to qualified mobile wireless communication devices manufactured by a first party but jointly serviced by other parties including at least one wireless service provider and a communication data relay service provider, said method comprising: maintaining an internet website having access to at least one down-Loadable feature provisioning software jointly developed and/or owned by said first party and at least said communication data relay service provider; providing download access control software for use by a device user PC base unit to access and use said website via a user PC base unit that has (a) access to said website and (b) a wired connector for connection to a mobile wireless communication device; authenticating said mobile wireless communication device by data exchanges between said website and said user PC base unit as a qualified hardware device, said authenticating step including use of a unique device identification number (UDIN) that is unique to the particular mobile wireless communication device requesting a download of said feature-provisioning software and a user ID assigned for use on said mobile wireless communication device by a particular wireless carrier service provider; and if authenticated and monetary payment has been received, downloading the requested feature-provisioning software to said qualified user PC base unit via the internet; and providing download provisioning software in said mobile wireless communication device and using such provisioning software to accept further downloading of the purchased feature-provisioning software from said user PC base unit.

21. A non-transitory machine readable medium as in claim 20 wherein plural down-loadable feature provisioning software are accessible at respectively associated prices at said website thereby providing a vending machine type of choice as to which such features are to be purchased and downloaded.

* * * * *